US012572124B2

(12) United States Patent
Lavrentyev et al.

(10) Patent No.: US 12,572,124 B2
(45) Date of Patent: Mar. 10, 2026

(54) SYSTEM AND METHOD FOR DETERMINATION OF ANOMALIES IN A CYBER-PHYSICAL SYSTEM

(71) Applicant: AO Kaspersky Lab, Moscow (RU)

(72) Inventors: Andrey B. Lavrentyev, Moscow (RU); Artem M. Vorontsov, Moscow (RU); Dmitry A. Ivanov, Moscow (RU); Vyacheslav I. Shkulev, Moscow (RU); Nikolay N. Demidov, Moscow (RU); Artyom M. Nechiporuk, Moscow (RU); Maxim A. Mamaev, Moscow (RU); Alexander V. Travov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 774 days.

(21) Appl. No.: 17/939,470

(22) Filed: Sep. 7, 2022

(65) Prior Publication Data

US 2023/0297057 A1     Sep. 21, 2023

(30) Foreign Application Priority Data

Mar. 16, 2022    (RU) ........................... RU2022106919

(51) Int. Cl.
G05B 19/048          (2006.01)

(52) U.S. Cl.
CPC .. G05B 19/048 (2013.01); G05B 2219/24024 (2013.01)

(58) Field of Classification Search
CPC .................... G05B 19/048; G05B 2219/24024
See application file for complete search history.

(56) References Cited

U.S. PATENT DOCUMENTS

| | | | |
|---|---|---|---|
| 11,175,976 B2 | 11/2021 | Lavrentyev et al. | |
| 2018/0129195 A1* | 5/2018 | Lee | G06Q 10/20 |
| 2020/0210263 A1* | 7/2020 | Lavrentyev | G06F 18/2148 |
| 2020/0210264 A1* | 7/2020 | Lavrentyev | G06F 11/079 |
| 2025/0023902 A1* | 1/2025 | Thepie Fapi | G05B 23/0256 |

* cited by examiner

*Primary Examiner* — Zhipeng Wang
(74) *Attorney, Agent, or Firm* — ArentFox Schiff LLP; Michael Fainberg

(57)          ABSTRACT

A method for determination of anomalies in a cyber-physical system (CPS) includes generating one or more diagnostic rules configured to calculate at least one auxiliary CPS variable. One or more values of the at least one auxiliary CPS variable are calculated for a predefined output interval of time based on collected values of a group of primary CPS variables for a predefined input interval of time based on the generated diagnostic rule. An anomaly is determined based on the collected values of the group of primary CPS variables and the one or more calculated values of the at least one auxiliary CPS variable.

20 Claims, 8 Drawing Sheets

| 2001 | Heart rhythm monitor |
| 2002 | Blood oxygen saturation detector |
| 2003 | Pedometer |
| 2004 | Fingerprint detector |
| 2005 | Gesture identification detector |
| 2006 | Cameras |
| 2007 | Body temperature detector |
| 2008 | Microphone |

| 2009 | Ultraviolet radiation detector |
| 2010 | Geolocation system receiver |
| 2011 | Wireless communication module |
| 2012 | Room temperature detector |
| 2013 | Barometer |
| 2014 | Geomagnetic sensor |
| 2015 | Humidity detector |
| 2016 | Illumination detector |
| 2017 | Proximity detector |
| 2018 | Image depth detector |

| 2019 | Accelerometer |
| 2020 | Gyroscope |
| 2021 | Hall sensor |
| 2022 | Dosimeter-radiometer |

Fig. 1d

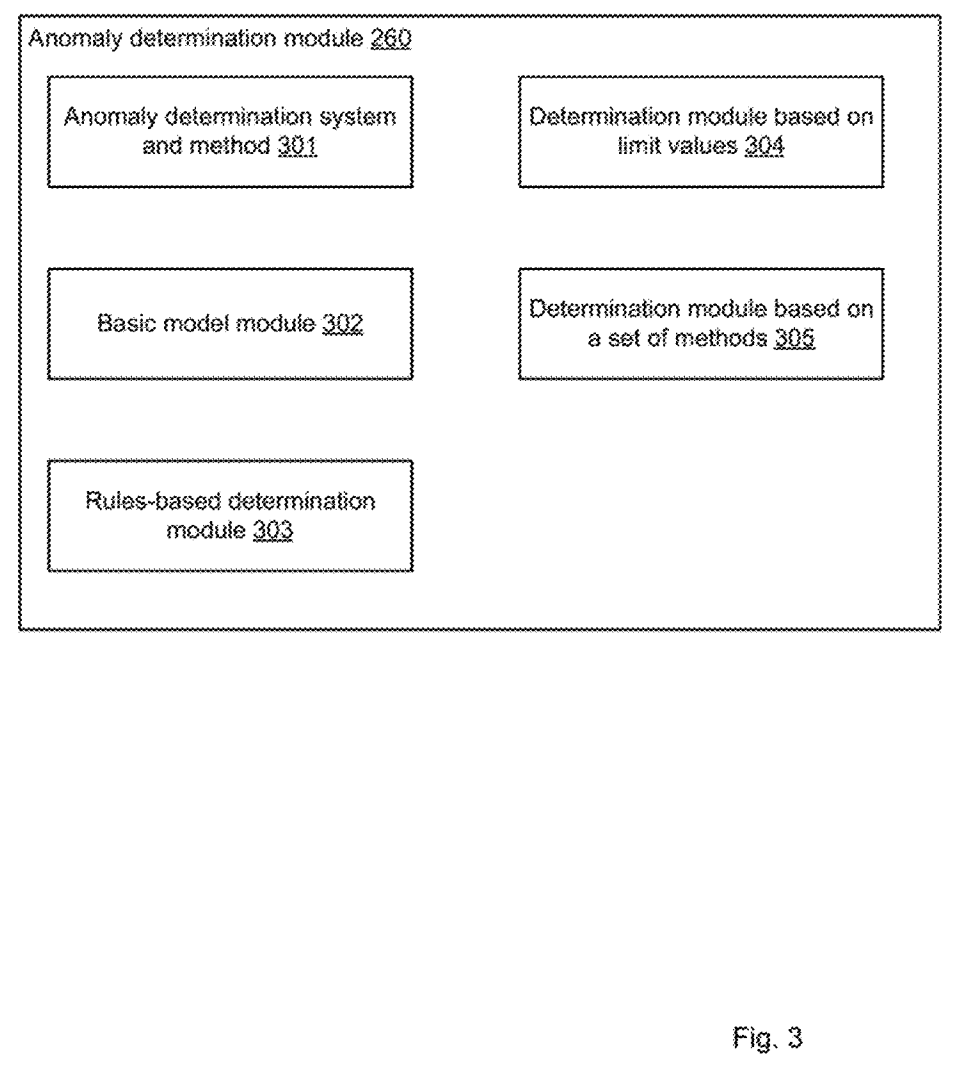

Anomaly determination module 260

Anomaly determination system and method 301

Determination module based on limit values 304

Basic model module 302

Determination module based on a set of methods 305

Rules-based determination module 303

Fig. 3

SYSTEM AND METHOD FOR DETERMINATION OF ANOMALIES IN A CYBER-PHYSICAL SYSTEM

CROSS REFERENCE TO RELATED APPLICATIONS

The present application claims priority to Russian Patent Application No. 2022106919, filed on Mar. 16, 2022, the entire content of which is incorporated herein by reference.

FIELD OF TECHNOLOGY

The present invention relates generally to the field of industrial safety and, more specifically, to systems and methods for determination of anomalies in a cyber-physical system (CPS).

BACKGROUND

One of the urgent issues of industrial safety is the problem of safe functioning of technological processes (TP) and operations. Among the main threats of a TP are wear and tear and failure of equipment and subassemblies, unintentional mistakes or malicious actions in the operational control, computer attacks on the control system and information system (IS), and the like.

In order to counteract various threats, safety systems may be used traditionally for protection of cyber-physical systems (CPS). The safety systems may include, but are not limited to, emergency protection systems (EPS), anomaly detection systems based on an automated control system for a technological process (ACS TP), and specially built "external" monitoring systems for a particular kind of equipment and subassemblies. Generally, the "external" monitoring systems are not necessarily integrated with the ACS TP. It should be noted that it may not be always possible to deploy the aforementioned "external" systems, by virtue of certain peculiarities of the CPS and the TP occurring in them. However, even in the simplest cases where such an installation is possible, deployment of "external" monitoring systems typically occurs only at critically vital nodes and subassemblies of the enterprise due to the cost and complexity of servicing such systems.

By contrast with "external" systems, the EPS may be designed during the design of the enterprise and may be integrated in the ACS TP. Such integration may prevent previously known critical processes from taking place. One advantage of the EPS is its simplicity, its orientation to production processes of a particular enterprise, and its inclusion of all the design and technology solutions adopted at that enterprise. The drawbacks of the EPS may include, but are not limited to, rather sluggish decision making in the system and the presence of the human factor in the making of these decisions. Furthermore, the EPS and associated methodology typically functions under the assumption of properly working monitoring and measuring instruments (MMI). In practice, it is not always possible to ensure a faultless operation of the MMI in full, because the MMIs periodically break down, have a tendency to temporary failures. Furthermore, redundancy for all the MMI is extremely costly and not always technically feasible.

Anomaly detection systems are typically based on the telemetry of an ACS TP. Due to completeness of such telemetry data, anomaly detection systems may have the capability of "seeing" all the TPs of an enterprise at the same time in their interrelationship with each other, which makes it possible to detect anomalies reliably even during failures of the MMI. The wealth of data provided in the ACS TP enables monitoring of the entire enterprise—both the physical (chemical or other) processes of the enterprise and the proper working of all monitoring systems for these processes, which may include correct actions by the production operators. The machine learning models used in such systems may be trained based on a number of inputs and characteristics. Such trained models may include highly effective statistical models for the proper working of an enterprise with an enormous number of analyzed variables. Such trained models may be able to find even slight deviations in the working of the equipment. In other words, anomaly detection systems may detect an anomaly at an early stage.

The special architecture and interface of anomaly detection systems allows them to work in parallel with the ACS TP to find anomalies (fault detection), to display and localize (fault isolation) the anomalies found, and also to notify the production operators as to the anomalies found, indicating, for example, the particular process variables used to determine that anomaly.

However, the existing systems for determination and localization of anomalies using the telemetry data of the ACS TP, typically, only handle critical data circulating in the particular ACS TP including MMI data, the data of the control systems, the data of actuator commands. The existing systems typically do not consider the derivatives of such data, also known as synthetic data, namely, certain functions of such data and their combinations, their window analysis mean values, their moving-average statistical characteristics integrated transformations, and the like. At the same time, generated synthetic data oftentimes carry much more useful information about the state of a particular subassembly or piece of equipment of the enterprise than the raw data. For example, it is well known that the MMI data generally carry noise. The analysis of MMI data for the presence of anomalies typically needs certain smoothed-out values (in order to balance out the noise input), rather than instantaneous values. Yet another non-limiting example includes a CPS containing detectors of vibrational displacement and vibrational acceleration, in which the analysis of data from the detectors traditionally involves the use of a window Fourier transform, followed by looking for parasitic oscillatory modes. A more general example involves systems where the production technology or standardization enactments introduce a whole series of diagnostic rules for the calculating of synthetic, not necessarily directly measurable parameter values subject to analysis and monitoring.

Thus, there is a need for efficient determination of anomalies in a CPS handling that use both CPS variables and auxiliary CPS variables derived from the former.

SUMMARY

Disclosed are systems and methods for increasing the accuracy of the detection of anomalies in a CPS.

Advantageously, the disclosed method determines anomalies using both primary CPS variables and auxiliary CPS variables derived from the former.

In one aspect, a method for determination of anomalies in a cyber-physical system (CPS) includes generating one or more diagnostic rules configured to calculate at least one auxiliary CPS variable. One or more values of the at least one auxiliary CPS variable are calculated for a predefined output interval of time based on collected values of a group of primary CPS variables for a predefined input interval of time based on the generated diagnostic rule. An anomaly is determined based on the collected values of the group of primary CPS variables and the one or more calculated values of the at least one auxiliary CPS variable.

In one aspect, generating the one or more diagnostic rules includes specifying at least one of: the group of primary CPS variables to be used in the diagnostic rule; a method of calculating the one or more values of at least one auxiliary CPS variable from the collected values of the group of primary CPS variables; and at least one input interval of time for the collected values of the group of primary CPS variables and at least one output interval of time for calculating the one or more values of the auxiliary CPS variable.

In one aspect, the method of calculating the one or more values of at least one auxiliary CPS variable comprises at least one of: a predetermined formula for calculating the one or more values of the at least one auxiliary CPS variable from the collected values of the group of primary CPS variables; a method of calculating the one or more values of at least one auxiliary CPS variable by smoothing the collected values of the group of primary CPS variables; a method of calculating the one or more values of at least one auxiliary CPS variable by calculating at least one of: long-term trends of the values of the group of primary CPS variables, perform polynomial approximations of the values of the group of primary CPS variables, determine statistical window points of the group of primary CPS variables; or a method of calculating the one or more values of at least one auxiliary CPS variable by using a previously trained machine learning model to calculate the one or more values of at least one auxiliary CPS variable, wherein the collected values of the group of primary CPS variables is used as input data for the machine learning model.

In one aspect, the collected values of a group of primary CPS variables comprise at least one of: measurement obtained by a data transmitter; a value of a manipulated variable of an actuating mechanism; a setpoint of the actuating mechanism; a value of input signals of a proportional-integral-derivative (PID) controller; and a value of an output signal of the PID controller.

In one aspect, the one or more diagnostic rules comprise one or more recursive diagnostic rules. At least one previously calculated auxiliary CPS variable is used as the primary CPS variable.

In one aspect, the group of primary CPS variables comprises a subset of all CPS variables.

In one aspect, determining the anomaly comprises using at least one subset of all CPS variables as input data with the method of calculating the one or more values of at least one auxiliary CPS variable and wherein the anomaly is determined by at least one of: determining if a total error of prediction is greater than a threshold value, wherein the total error is of prediction is calculated based on one or more predictions for values of the at least one subset of CPS variables; applying a trained machine learning model to values of the at least one subset of CPS variables; determining if at least one rule for determination of anomalies is fulfilled; determining if a value of at least one variable from the subset of CPS variables exceeds a predetermined range of values for the corresponding CPS variable.

In one aspect, a method of determination of anomalies is selected individually for each subset of CPS variables. A level of criticality is calculated for the one or more anomalies determined from the each subset of CPS variables. An overall level of criticality is calculated for each of the one or more determined anomalies.

In one aspect, the overall level of criticality is calculated by averaging two or more levels of criticality for all methods used to determine a particular anomaly. The anomaly is confirmed if the overall level of criticality is greater than a predefined threshold.

In one aspect, one or more levels of criticality of the anomalies are specified by at least one of: an operator of the CPS, a previously trained machine learning model using statistical data on previously determined anomalies.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 1d presents a block diagram illustrating one possible set of data transmitters of devices.

FIG. 3 is a schematic diagram of anomaly determination module.

DETAILED DESCRIPTION

Figure 1A:
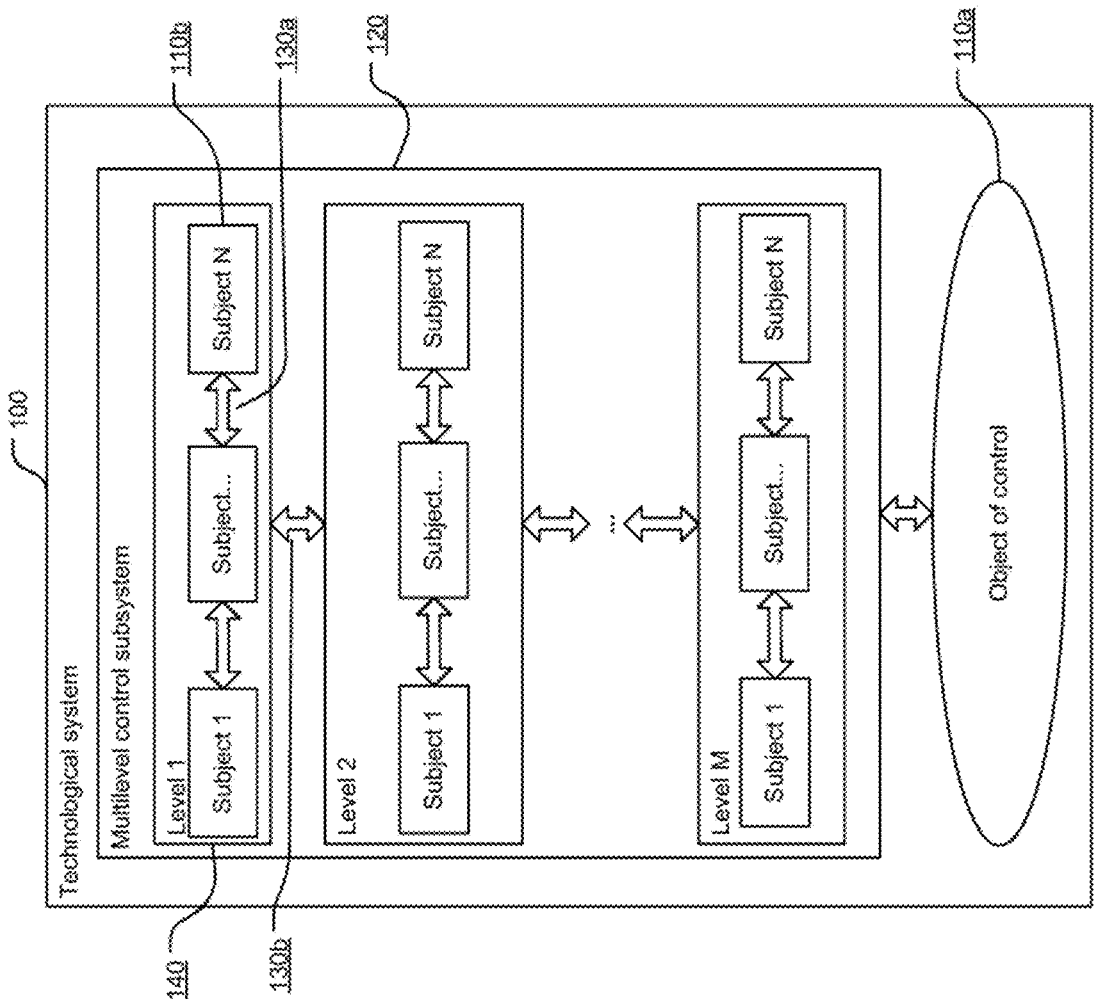
FIG. 1a shows a schematic illustration of an exemplary technological system.

Exemplary aspects are described herein in the context of a system, method, and computer program product for determination of anomalies in a cyber-physical system (CPS). Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Glossary: a number of terms are defined herein which will be used to describe variant aspects of the present disclosure.

Object of control—a technological object to which external actions are applied (controlling and/or perturbing actions) in order to alter its state. In particular, object of control may be a device (such as an electric motor) or a technological process (or a portion thereof).

Technological process (TP)—a process of material production comprising the consecutive change of the states of a material entity (e.g., an object of work).

Control loop—material entities and controlling functions needed for automated regulation of the values of the metered process variables to take on the values of desired setpoints. A control loop may include, but is not limited to, data transmitters and sensors, controllers, and actuators.

Process Variable (PV)—a current metered value of a particular portion of a TP which is being observed or monitored. For example, the measurement of a data transmitter may be a process variable.

Setpoint—the value of a process variable which is to be maintained.

Manipulated Variable (MV)—a variable which is regulated such that the value of a process variable is maintained at the level of a setpoint.

External action—a method of changing the state of an element to which the action is applied (for example, an element of a technological system (TS)) in a certain direction. The external action may be transmitted in the form of a signal from one element of the TS to another element of the TS.

State of an object of control—the entirety of object's essential attributes, as expressed by the variables of the states which are to be changed or maintained under the influence of the external actions, including, but not limited to, the controlling actions on the part of the control subsystem. A variable of state is one or more numerical values characterizing an essential attribute of an object. The variable of state may be a numerical value of a physical quantity.

Formal state of an object of control—the state of an object of control corresponding to the process chart and other process documentation (if it involves a TP) or a movement itinerary (if it involves a device).

Controlling action—a goal-oriented (the goal of the action is an action on the state of the object), legitimate (specified by the TP), external action on the part of the subjects of control of a control subsystem on an object of control, bringing about a change in the state of the object of control or maintaining the state of the object of control.

Subject of control—a device which applies a controlling action to an object of control or transmits a controlling action to another subject of control for its transformation prior to being applied directly to the object.

State of a subject of control—the entirety of subject's essential attributes as expressed by the variables of state which are to be changed or maintained under the influence of external actions. A variable of state is one or more numerical values characterizing an essential attribute of a subject. The state variable may be a numerical value of a physical quantity.

Essential attributes (respectively, also essential state variables) of a subject of control—attributes exerting a direct influence on the state of an object of control. The essential attributes of an object of control are attributes exerting a direct influence on monitored factors (such as, but not limited to, accuracy, safety, effectiveness) of the functioning of a TS. For example, essential attributes may include the compliance of cutting conditions with the formally designated conditions, the movement of a train in accordance with its itinerary, the maintaining of a reactor temperature within permissible bounds. Depending on the monitored factors, variables of state of the object of control and related variables of state of the subjects of control exerting control actions on the object of control are selected.

Multilevel control subsystem—the entirety of subjects of control involving multiple levels.

Cyber-physical system (CPS)—a concept in information technology signifying an integration of computing resources in physical processes. In a CPS system, data transmitters, equipment, and computer systems are connected along the course of the entire chain of value creation, beyond the framework of a single enterprise or business. These systems interact with each other by means of standard Internet protocols for the forecasting, self-adjusting, and adapting to changes. Examples of a cyber-physical system include, but are not limited to a technological system, the Internet of Things (IoT) (including portable devices), and the industrial Internet of Things.

Internet of Things—a computer network of physical objects ("things"), equipped with built-in network technologies for interacting with each other or with the outer world. The Internet of Things may include, but is not limited to, portable devices, electronic systems of means of transportation, smart cars, smart cities, industrial systems, and others.

Industrial Internet of Things (IIoT)—equipment and platforms of extended analytics, connected to the Internet, which perform a processing of data obtained from connected devices. The devices of the IIoT may be as diverse as possible—ranging from small weather data transmitters to complex industrial robots. Even though the term "industrial" conjures up such associations as warehouses, shipyards, and factory halls, the IIoT technology has a great potential for use in the most diverse of fields, including, but not limited to, agriculture, health care, financial services, retail trade, and advertising. The industrial Internet of Things is a subcategory of the Internet of Things.

Technological system (TS)—the functionally interconnected entirety of the subjects of control of a multilevel control subsystem and an object of control (a TP or device), realizing a change in the state of the object of control through changing the states of the subjects of control. The architecture of the technological system is formed by the basic elements of the technological system (the interconnected subjects of control of the multilevel control subsystem and the object of control), as well as the links between these elements. In the case when the object of control in the technological system is a technological process, the final goal of the control is to change the state of an object of work (raw material, machining blanks, etc.) by changing the state of the object of control. When the object of control in the technological system is a device, the final goal of the control is to change the state of the device (for example, a means of transportation, a spacecraft, etc.). The functional interplay of the elements of the TS refers to the interplay between the states of these elements. There might not even be an immediate physical link between the elements. For example, there might be no physical link between the actuators and the technological operation. For example, the cutting speed is functionally related to the speed of revolution of a spindle, even though these state variables are not physically related.

Computer attack (also known as cyber attack)—a deliberate action against computer systems and computer/telecommunication networks by hardware and software, carried out for purposes of violating the security of information in these systems and networks.

FIG. 1a shows a schematic illustration of an exemplary technological system (TS) 100. In an aspect, the components of the TS may include, but are not limited to: the object of control 110a; the subjects of control 110b, a multilevel control subsystem 120; horizontal links 130a and vertical links 130b. The subjects of control 110b are grouped by levels 140.

Figure 1B:
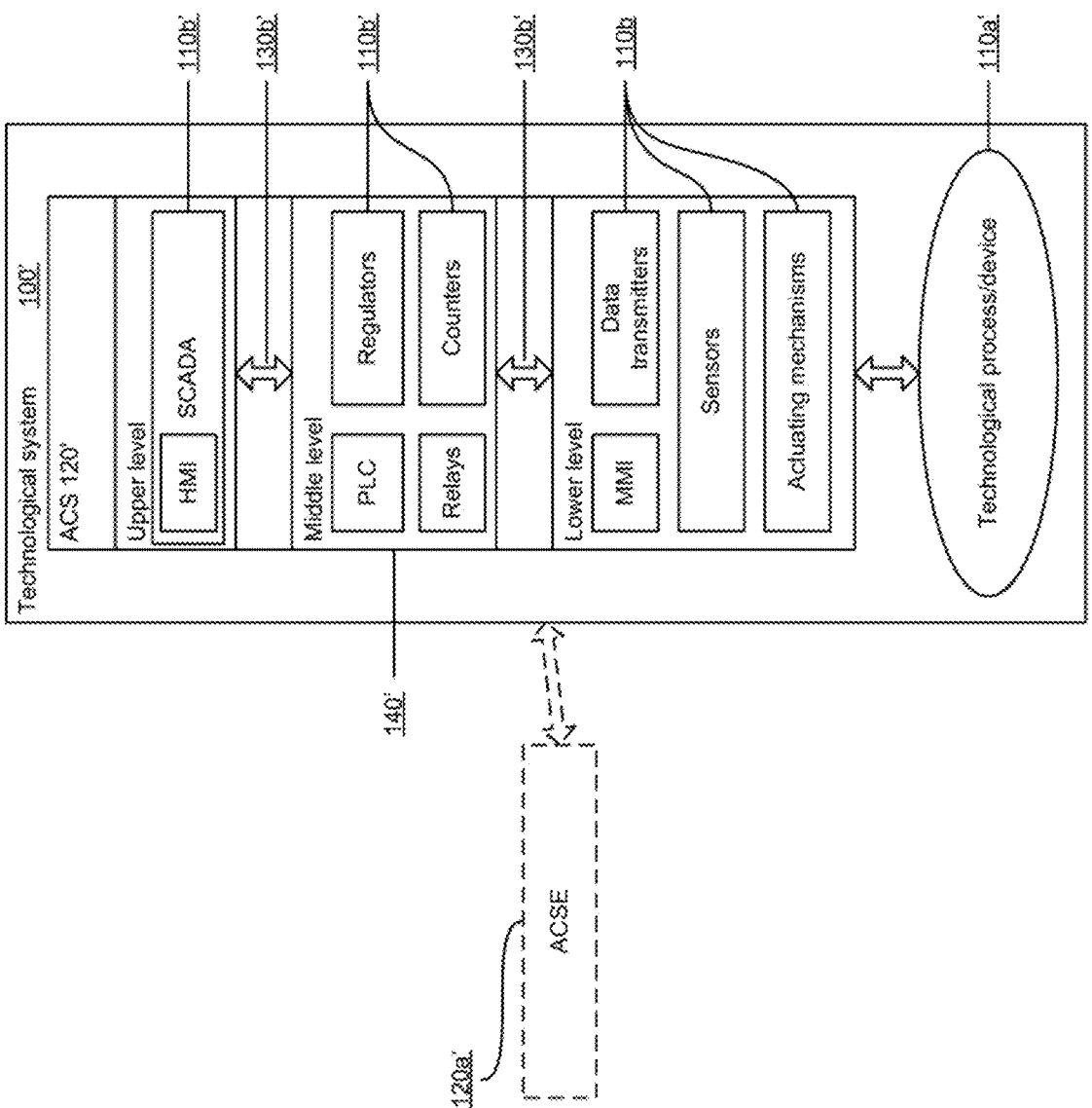
FIG. 1b shows schematically a particular example of the implementation of a technological system.

FIG. 1b shows schematically a particular example of an implementation of a technological system 100'. The object of control 110a' may include, but is not limited to, a TP or a device. Controlling actions may be applied to the object of control 110a' which may be worked out and realized by an automated control system (ACS) 120'. In an aspect, the ACS 120' may include three levels 140', which may include the subjects of control 110b', interconnected with each other both horizontally by the horizontal links (links within a level, not illustrated in FIG. 1*b*) and vertically by the vertical links 130*b*' (links between levels). The interconnecting links may be functional. In other words, in the general case a change in state of a subject of control 110*b*' on one level may produce a change in state of the subjects of control 110*b*' connected to it on this level and the other levels. Information about a change in state of a subject of control 110*b*' may be transmitted in the form of a signal along the horizontal and vertical links established between the subjects of control 110*b*'. For example, information about a change in state of a particular subject of control 110*b*' may be an external action in relation to the other subjects of control 110*b*'. The levels 140' in the ACS 120' may be defined in accordance with the purpose of the subjects of control 110*b*'. The number of levels may vary depending on the complexity of the ACS 120'. Simple systems may contain one or more lower levels. Wired networks, wireless networks, and integrated microcircuits may be used for the physical link of the elements of the TS (110*a*', 110*b*') and the subsystems of the TS 100'. Ethernet network, an industrial Ethernet, and industrial networks may be used for the logical link between the elements of the TS (110*a*', 110*b*') and the subsystems of the TS 100'. Different types and standards that may be used by the industrial networks and protocols include, but are not limited to: Profibus, FIP, ControlNet, Interbus-S, DeviceNet, P-NET, WorldFIP, LongWork, Modbus and others.

The upper level (the supervisory control and data acquisition level, SCADA) may be the level of dispatcher and operator control. The upper level may include, but is not limited to, at least the following subjects of control 110*b*': controllers, control computers, human-machine interfaces (HMI). It should be noted that FIG. 1*b* shows the SCADA within a single subject of control. The upper level may be configured to track the states of the elements of the TS (110*a*', 110*b*'), to obtain and store information about the state of the elements of the TS (110*a*', 110*b*'), and if necessary to correct this state.

The middle level (the CONTROL level) may be the level of the controllers. The middle level may include, but is not limited to at least the following subjects of control 110*b*': programmable logic controllers (PLC), counters, relays, regulators. The subjects of control 110*b*' of PLC type may be configured to obtain information from the subjects of control 110*b*' of monitoring and measuring instrument type and the subjects of control 110*b*' of data transmitter type regarding the state of the object of control 110*a*'. The subjects of control 110*b*' of PLC type may be further configured to create a controlling action in accordance with a programmed control algorithm for the subjects of control 110*b*' of actuator type. The actuators may be configured to directly realize the given controlling action (apply it to the object of control) at the lower level. An actuator may be a component of the actuating device (equipment). Regulators, such as, but not limited to, proportional—integral—derivative controllers or PID controllers may be devices with feedback in the control loop.

The lower level (the Input/Output level) may be the level that includes subjects of control 110*b*' such as, but not limited to, data transmitters and sensors, monitoring and measuring instruments (MMI), which monitor the state of the object of control 110*a*', actuators, and the like. The actuating mechanisms may be configured to act directly on the state of the object of control 110*a*' to bring it into conformity with a formal state. The formal state may include, for example, a state corresponding to the technological job order, the process chart, or some other process documentation (in the case of a TP) or movement itinerary (in the case of a device). On this lower level, the signals from the subjects of control 110*b*' of data transmitter type may be coordinated with the inputs of the subjects of control 110*b*' of the middle level. Furthermore, the controlling actions elaborated by the subjects of control 110*b*' of PLC type may be coordinated with the subjects of control 110*b*' of actuator type, which implement them. An actuator may be a component of an actuating device. An actuating device may be configured to move a regulating element in accordance with signals arriving from the regulator or a controlling device. Actuating devices are the last link in the chain of automatic control. Generally, actuating devices may include, but are not limited to the following units:

an amplifying device (contactor, frequency converter, amplifier, and the like);

an actuating mechanism (electric, pneumatic or hydraulic drive) with feedback elements (detectors of the position of an output shaft, a signaling of end positions, a manual drive, and the like);

a regulating element (gates, valves, slides, and the like).

Depending on the application conditions, actuating devices may differ in their design. The actuating mechanisms and regulating elements are usually among the basic units of the actuating devices.

In a particular example, the actuating device may comprise the actuating mechanism.

It should be noted that the tasks of planning and control of an enterprise may be handled by an ACSE 120*a*' (automatic control system for an enterprise), which may be a part of the ACS 120'.

Figure 1C:
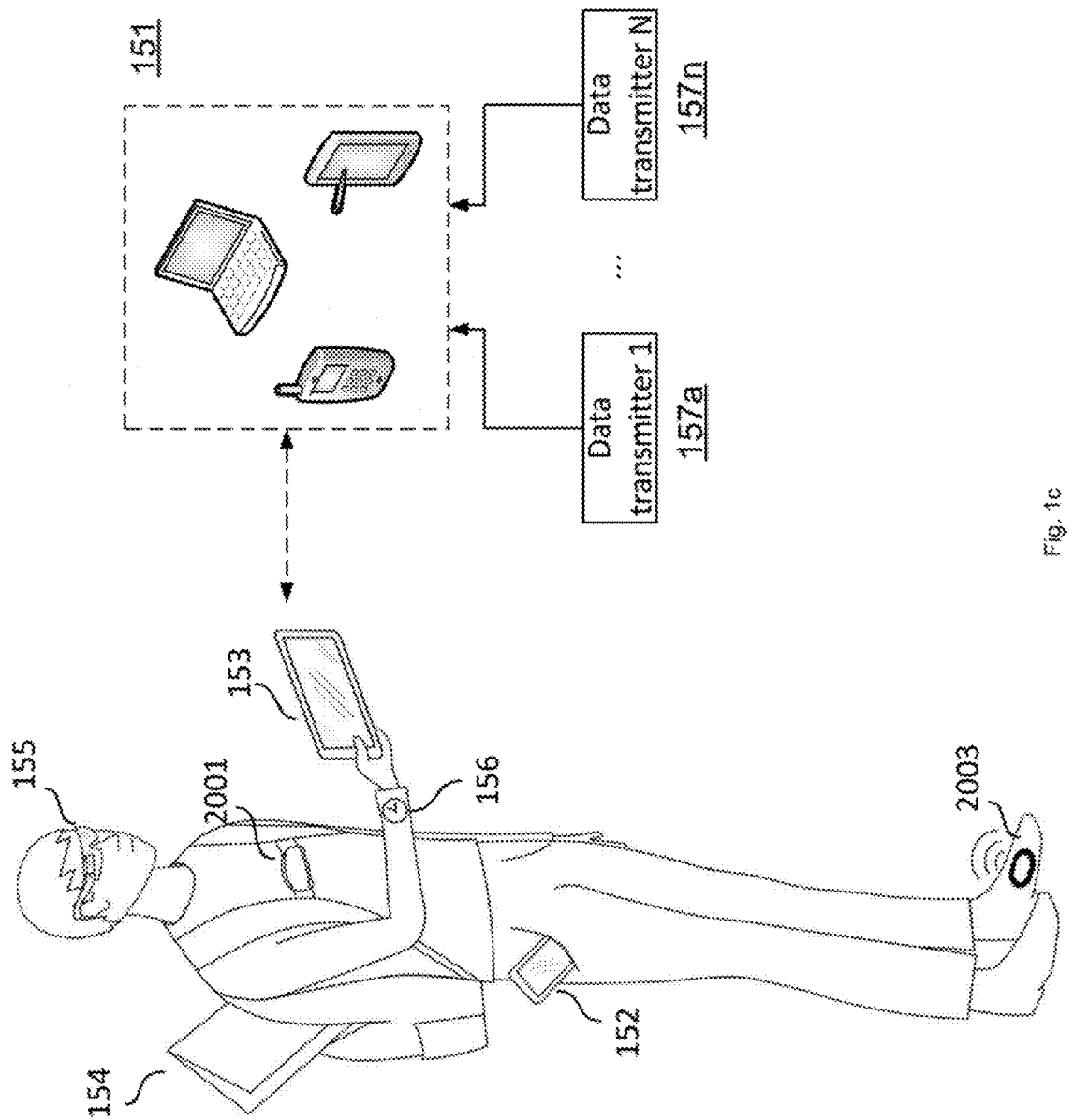
FIG. 1c is a diagram illustrating one possible variant of the organization of the Internet of things on the example of portable devices.

FIG. 1*c* is a diagram illustrating one possible variant for the organization of an Internet of Things based on the example of portable devices. The system illustrated in FIG. 1*c* may include, but is not limited to, a group of different computer devices 151 of a user. The user devices 151 may include, but are not limited to, a smartphone 152, a tablet 153, a notebook 154, portable devices, such as augmented reality glasses 155, a "smart" watch 156, and others. The user devices 151 may include a group of different data transmitters 157*a*-157*n*, such as, but not limited to a heart rhythm monitor 2001 and a pedometer 2003.

It should be noted that the data transmitters 157*a*-157*n* may be present either on a single user device 151 or on multiple devices. Moreover, certain data transmitters 157*a*-157*n* may be present on multiple user devices 151 at the same time. Some of the data transmitters 157*a*-157*n* may be present as multiple units. For example, a Bluetooth module may be present on all of the user devices 151, while the smartphone 152 may contain two or more microphones needed for noise suppression and determination of the range from a sound source.

FIG. 1*d* presents a block diagram illustrating one possible set of data transmitters of the devices 151. For example, the following may be present among the data transmitters 157*a*-157*n*:

heart rhythm monitor (heartbeat transmitter) 2001 may be configured to determine the pulse of the user. In one aspect, the heart rhythm monitor 2001 may contain electrodes and can measure the electrocardiogram;

blood oxygen saturation detector 2002;

pedometer 2003;

fingerprint detector 2004;

gesture detector 2005 may be configured to recognize gestures of the user;

cameras 2006, such as a camera pointing at the surroundings of the user and a camera pointing at the eyes of the user, which may be configured to determine movements of the eyes of the user, as well as to authenticate the identity of the user from the iris or retina of the eye;

body temperature detector 2007 of the user (for example, one having a direct contact with the body of the user, or a noncontact type);

microphone 2008;

ultraviolet radiation detector 2009;

geolocation system receiver 2010, such as, but not limited to, a GPS, GLONASS, BeiDou, Galileo, DORIS, IRNSS, QZSS or other receiver;

one of more wireless communication modules (such as, but not limited to, GSM, LTE, NFC, Bluetooth, Wi-Fi or others) 2011;

room temperature detector 2012;

barometer 2013;

geomagnetic detector 2014 (for example, electronic compass);

humidity detector 2015;

illumination detector 2016;

proximity detector 2017;

image depth detector 2018;

accelerometer 2019;

gyroscope 2020;

Hall detector 2021 (magnetic field detector);

dosimeter/radiometer 2022.

Figure 2:
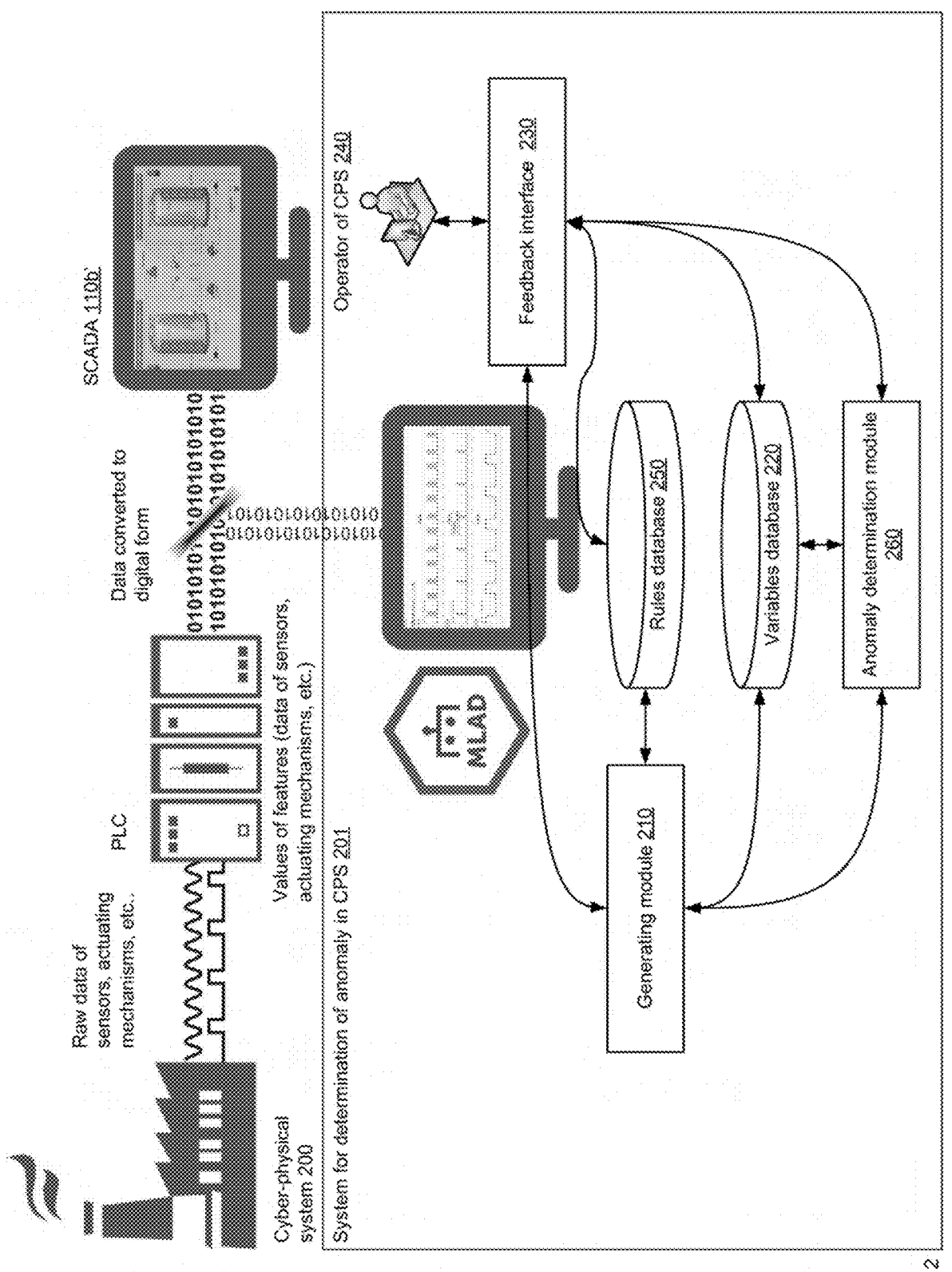
FIG. 2 is a schematic diagram showing a system for determination of anomalies in a cyber-physical system.

FIG. 2 is a schematic diagram showing an example of a cyber-physical system 200, possessing certain characteristics, as well as a system for detection, classification, and monitoring of anomalies 201. The CPS 200 is shown in FIG. 2 in a simplified aspect. Examples of a CPS 200 may include the previously described technological system (TS) 100 (see FIG. 1*a*-1*b*), the Internet of Things (see FIG. 1*c*-1*d*), and an industrial Internet of Things. For illustrative purposes only, herein TS is discussed as the basic example of a CPS 200. As noted above in conjunction with FIGS. 1*a*-1*b*, the CPS 200 may include, but is not limited to, a group of subjects of control, such as data transmitters, actuating mechanisms, and PID controllers. The data of these subjects of control in unprocessed form may be sent to a PLC via an analog signal, for example. The PLC may be configured to perform a processing of the data and may convert the data into digital form—into the values of the variables of the CPS. Variables of the CPS may include, but are not limited to, the process variables of the CPS (that is, the telemetry data of the CPS 200). The values of the variables of the CPS may be sent to the SCADA system 110*b*' and the discussed herein system 201.

The system 201 contains a generating module 210, an anomaly determination module 260, a variables database 220, a rules database 250, and a feedback interface 230 for interacting with the operator of the CPS 240.

In an aspect the cyber-physical system 200 may be described by at least one of the following characteristics:

the production industry in which the CPS is operating;

the types of processes described by the variables of the CPS, including, but not limited to the following types: continuous, conveyor, cyclical;

the presence of seasonality and/or trends in the features of the CPS; time lag in the processes of the CPS;

response time of the CPS to changes occurring in the CPS and in the outer world; level of danger of production for the workers and the ecology;

cost of a shutdown of the technological processes due to non-standard situations; type of control, for example, the control performed with the use of PID controllers, finite-state automatons, or a combination of the two;

type of subject of control, characterized by at least one feature, the type of subject of control being at least a data transmitter, an actuating mechanism, or a PID controller; self-diagnostic data of the CPS;

operable status of the subject of control;

interconnection of the subjects of control within the technological process.

The variables of the CPS may be the numerical characteristics of the subjects of control—the data transmitters, the actuating mechanisms, and the PID controllers. Accordingly, the values of the variables of the CPS may include, but are not limited to, at least one of the values: a measurement (reading) of a data transmitter; the value of a manipulated variable of an actuating mechanism; the setpoint of an actuating mechanism; the values of the input signals of a proportional—integral—derivative regulator (PID controller); the value of the output signal of a PID controller, and other process variables of the CPS.

The values of the variables of the CPS may be used by the anomaly determination module 260, which may be configured to determine anomalies in the CPS 200. An anomaly in the CPS 200 may be an event characterizing a departure from the norm of a value of one or more variables of the CPS. An anomaly may arise in the CPS 200, for example, due to a computer attack, due to an improper or unlawful intervention in the working of the TS or TP, due to a fault or deviation of the technological process, including one involving periods of change in the operating conditions, due to a transfer of the control loops to manual mode, due to improper readings of the data transmitters, as well as other well-known reasons. The information on the anomalies found in the CPS 200 may be sent to the operator of the CPS 240 via the feedback interface 230, for example. It should be noted that in various aspects there might be both one-way and two-way communication between the system 201 and the operator of the CPS 240 (from the system 201 to the operator of the CPS 240 or vice versa, from the operator of the CPS 240 to the system 201 or both ways).

In an aspect, the generating module 210 may be configured to generate at least one diagnostic rule. A diagnostic rule may be a rule which determines the method of generating and calculating the values of at least one auxiliary CPS variable from the values of the specified group of CPS variables. In an aspect, an auxiliary CPS variable may be a numerical (or categorical) variable absent from the initial sample that may be calculated by employing various transformations of the CPS variables from the initial sample. Particular aspects describing auxiliary CPS variables are described in greater detail below. The generated diagnostic rules may be kept in the rules database 250. The generating module 210 may also be configured to calculate the values of at least one auxiliary CPS variable based on at least one generated diagnostic rule. The values of the auxiliary CPS variables may be kept in the variables database 220 with a notation (supplemental information) containing the group of CPS variables used in generating the auxiliary CPS variable.

In an aspect, the generating module 210 may be configured to generate a diagnostic rule as follows. First of all, a group of CPS variables may be specified, to be used for calculating the values of at least one auxiliary CPS variable. The group of CPS variables may be specified automatically in accordance with the characteristics of the CPS 200. Moreover, the group of CPS variables may be specified by obtaining feedback from the operator of the CPS 240 via the feedback interface 230. The values of the CPS variables from the given group may be sampled on time grids which are not uniform over time and not synchronized. For example, the values of one CPS variable may be sampled with a periodicity of once a second, values of another CPS variable may be sampled at once a minute, and a third CPS variable may be measured in response to an occurring event, and so forth.

The method of using the diagnostic rule may then be specified. In other words, the generating module 210 may receive an input indicating the method for generating and calculating the values of at least one auxiliary CPS variable from the data of the values of the specified group of CPS variables.

In an aspect, an input window may then be specified for the use of the rule. In other words, the generating module 210 may receive an input indicating an interval of time $[t-\Delta t, t]$, oriented retrospectively, where $t>0$ is the current moment of time, and $\Delta t>0$ is the dimension of the input window. The diagnostic rule may utilize the values of the group of CPS variables that are specified in the input window, (i.e., at moments of time within the input window). In other words, the input window may represent the interval of time for the values of the group of CPS variables. In an aspect, the input window may be a sliding interval of time. In a particular aspect, a time grid Et may be specified (selected) in the input window, depending on the moment of time t and covering the interval $[t-\Delta t, t]$. After this, the generating module 210 may interpolate the CPS variables from the group of variables for the given rule on the specified time grid.

In an aspect, if there are no values for any CPS variable in a particular input window, the generating module 210 may assume the variable's last value to be its value. If the last value is also absent, the generating module 210 may assume a default value. In this case, the generating module 210 may save in advance a list of default values for the CPS variables. It should be noted that the time grid Et may be selected both individually for each moment of time t and by a certain unified method for all input windows. For example, a uniform grid may be constructed in each input window with a certain increment $0<\delta t \leq \Delta t$. It should also be noted that the time grid of the input window and the size of the input window. At can be determined individually for each diagnostic rule and may be selected based on the characteristics and behavior of the particular TP and, accordingly, the CPS 200 represented by the CPS variables and the diagnostic rule.

Next, the generating module 210 may determine an output window. In other words, the generating module 210 may determine the interval of time $[t-\tau_t, t]$, and an output time grid Ft of the diagnostic rule. Here, $0<\tau_t<\Delta t$ is the specified time dimension of the output window of the diagnostic rule, depending on the moment of time t. As a result, the generating module 210 may calculate the values of at least one auxiliary CPS variable in the output window $[t-\tau_t, t]$ on the time grid Ft by applying the diagnostic rule to the values of the CPS variables from the corresponding group in the input window $[t-\Delta t, t]$ on the grid $\Sigma t$. After this, the generating module 210 may shift the input window by an increment equal to the dimension of the output window $\tau_t$. The output window may be shifted accordingly. In an aspect, the generating module 210 may repeat the process of calculating the auxiliary CPS variable corresponding to the given diagnostic rule. As a result, the auxiliary CPS variable may be calculated on a unified time grid $\cup \Gamma_t$, where the symbol $\cup$ signifies the union of sets in time t. Thus, the output window may be the interval of time for calculating the values of the auxiliary CPS variable.

It should also be noted that the time grid of the output window and the dimension of the output window $\tau_t$ may be determined individually for each diagnostic rule and may be selected based on the characteristics and behavior of the particular TP and, accordingly, the CPS 200 as represented by the CPS variables and the diagnostic rule.

Hence, the method of applying the diagnostic rule consists in generating and calculating the values of at least one auxiliary CPS variable. It should be noted that the generating module 210 may apply the diagnostic rule by streaming in real time or as a computation on a group of historical data of the CPS variables.

In an aspect, the values of the auxiliary CPS variables may be calculated by a predetermined formula from instantaneous values (i.e., at $\tau_t=\Delta t$ and $\Sigma_t=\Gamma_t=\{t\}$) of the group of CPS variables. In another aspect, the generating module 210 may calculate the values of the auxiliary CPS variables by smoothing the CPS variables, for example, if the values of the CPS variables contain noise. In yet another aspect, the values of the auxiliary CPS variables may be calculated by the generating module 210 based on convolutions or integral transformations of values of CPS variables, smoothed or nonsmoothed derivatives of values of CPS variables, Fourier transform spectra or wavelet transforms of values of CPS variables. In yet another aspect, the values of the auxiliary CPS variables may be calculated by calculating the long-term trends (regressions) of values of the group of CPS variables, polynomial and other approximations of the values of the group of CPS variables, statistical window points of the group of CPS variables. In yet another aspect, the generating module 210 may utilize a previously trained neural network model of machine learning to calculate the values of the auxiliary CPS variables. The values of the group of CPS variables may serve as the input data for the aforementioned neural network model. In an aspect, the rules database 250 may contain a group of previously generated diagnostic template rules. For example, one template may contain all the diagnostic rules calculating the convoluted values of a particular CPS variable with different kernels, including, but not limited to, smoothing kernels, differentiating kernels, and the like. In another aspect, the template of the diagnostic rules may be the calculation of a window spectrum of the Fourier transform of a particular CPS variable, the taking of certain differential operators of the CPS variables, the application of previously trained machine learning models to the CPS variables.

In this case, the generating module 210 may be configured to generate a diagnostic rule based on the indicated diagnostic template rules and taking into account the characteristics of the CPS 200. For example, if the CPS 200 contains PID controllers, the generating module 210 may use a template to construct a diagnostic rule using the setpoint and measurement of the PID controllers as the input variables. In an aspect, the generating module 210 may calculate the transient response of the PID controller in order to model the controlling output of the PID controller to be compared afterwards with the observed value. Similar templates may be generated for a cascade type PID controller and its outputs. Furthermore, if information is available about the TP of the enterprise, templates implementing predetermined formulas corresponding to the physical, chemical, and other processes occurring at the given enterprise may be utilized.

In yet another aspect, the generating module 210 may use recursive diagnostic rules. The recursive diagnostic rules may use, as the input CPS variable, at least one previously calculated auxiliary CPS variable. For example, for purposes of a detailed vibration diagnostics of the rotational equipment based on the data of a vibration inspection (vibrational velocity and vibrational acceleration detectors), the generating module 210 may use as the auxiliary CPS variables at the first level the spectrum of the window Fourier transform, which can be presented graphically in the form of a set of amplitudes of certain modes. An analysis of each of the modes individually or jointly may be done on the next level by using recursive rules, with the given amplitudes used as the inputs for calculating when certain limits are exceeded by these amplitudes, discovering linear rising trends in the amplitudes of the modes, and so forth. Thus, both the goals of a visual monitoring of the state of the vibrational modes (by the first-level rules) and the goals of a detailed numerical analysis of their amplitudes (by the second-level rules) may be achieved.

In yet another aspect, the generating module 210 may obtain the diagnostic rules via the feedback interface 230 from the operator of the CPS 240. In this case, the auxiliary CPS variables associated with the diagnostic rules may be accessible to the operator of the CPS 240 through the feedback interface 230. In an aspect, the feedback interface 230 may include a graphic interface of the system 201.

It should also be noted that both the set of historical data and the streaming data in the anomaly detection system 201 may be enriched by using the diagnostic rules.

Thus, the values of all CPS variables (primary variables) and the values of the auxiliary CPS variables may be used afterwards by the anomaly determination module 260 and may be used for the determination of anomalies in the CPS 200.

Examples of the anomaly determination module 260, especially the modules 301-305, are presented in FIG. 3, and a description of their aspects is presented hereafter. Each method of determination of anomalies implemented by the anomaly determination module 260 may obtain, as the input data, the values of the CPS variables of at least one subset of all CPS variables (hereinafter, the subset of variables of the CPS), and all of the subsets taken together form the set of all CPS variables. It should be noted that these subsets may match up, intersect, or not intersect each other.

Description of the anomaly determination module 260.

The anomaly determination module 260 may utilize a method for determination of an anomaly in a CPS 301, which performs the determination of an anomaly by predicting the values of a subset of the CPS variables and a subsequent determination of the total error of the prediction for the subset of CPS variables. The anomaly determination module 260 may find an anomaly in the CPS 200 if the total error of the prediction is greater than a predefined threshold value. In addition, the anomaly determination module 260 may determine the contribution of the subset of CPS variables to the total error of the prediction as the contribution of the error of the prediction of the corresponding CPS variable to the total error of the prediction.

The anomaly determination module 260 may include a basic model module 302, which may be configured to use a trained module of machine learning to identify the anomalies from the values of the subset of CPS variables (hereinafter: the basic model). The basic model for identifying anomalies may be trained with data of a teaching sample. The teaching sample may or may not include known anomalies in the CPS 200 and the values of the subset of CPS variables in a given period of time. In other words, a supervised machine learning model may be used by the anomaly determination module 260. In addition, an unsupervised machine learning model may be used as the basic model 302. To enhance the quality of the basic model 302, a testing and validation of the trained basic model may be done with testing and validation samples, respectively. The testing and validation samples may include, but are not limited to, known anomalies and values of the subset of CPS variables in a given time period prior to the known anomaly in the CPS 200, but different from the teaching sample. In yet another aspect, the anomaly determination module 260 may include a rules-based determination module 303, which may be configured to use rules for determining anomalies. Such rules may be previously formulated and obtained from the operator of the CPS 240 via the feedback interface 230. The aforementioned rules may contain conditions applicable to the values of the subset of CPS variables which, when fulfilled, determine that an anomaly is present.

In yet another aspect, the anomaly determination module 260 may include a determination module based on limit values 304, which may be configured to determine an anomaly when the value of at least one CPS variable from the subset of CPS variables goes beyond a previously established range of values for that CPS variable. These ranges of values may be calculated from the values of the characteristics or the documentation for the CPS 200 or obtained from the operator of the CPS 240 via the feedback interface 230.

In another particular aspect, the anomaly determination module 260 may include a determination module based on a set of methods 305, which may be configured to use a set of two or more of the above indicated methods which are implemented by the means of modules 301-304. In an aspect, the anomaly determination module 260 may determine the presence of an anomaly in the CPS 200 by averaging the results of the working of the methods of that set 305 (for example, a logical conjugation may be applied to the results of the working of the different methods).

In another aspect, when a set of two or more of the above listed methods are used to be implemented by the means and modules 301-304, different methods mentioned above may use different subsets of values from the total of all CPS variables as the input data, including intersecting and coinciding sets. In an aspect, all such subsets taken together may contain the values of all the CPS variables.

In a particular aspect, the subsets of CPS variables may be selected in consideration of at least one of the characteristics of the subset:
  significance of the CPS variables to the TP;
  the CPS variables belonging to a certain type of equipment;
  the physical (chemical or other) process;
  same type of physical CPS variables in the subset (temperatures, pressures, and so forth).

In a particular aspect, the subsets of CPS variables may be selected from the total group of CPS variables based on at least one of the characteristics of those subsets, the characteristics of the CPS, and the CPS variables.

In an aspect, the anomaly determination module 260 may calculate the following characteristics for purposes of determination of anomalies (implemented by one of the modules 301-304):
  the group of CPS variables ranked in descending contribution to the determination of the anomaly;
  the sizes of the deviations of the predicted values of the CPS variables from their true values, the root-mean-square accuracies of the predictions for individual CPS variables, and the entire collection of CPS variables used in the given method of detection of anomalies;

the maximum or mean values of the deviations of the observable values of the CPS variables from previously determined specified limits, the duration and frequency of such deviations;

the efficiency of such a method of determination of anomalies (for example, the memory volume, processor time, number of computer processor cores, number of computers connected in a network and participating in the implementation of the method, and others).

It should be noted that, for a given subset of the CPS, the method of determination of an anomaly may be selected in particular based on the following considerations: the accuracy and completeness of the determination of anomalies by the given method for that subset, the efficiency of the method on this subset, expert knowledge about the subset of CPS variables (if the CPS variables of the subset pertain to a certain TP, type of equipment, and so forth), and the like.

Thus, for each of the subsets of the CPS variables, the choice of the method for determination of an anomaly may be based on the characteristics of that method and the characteristics of the subset of CPS variables to be used for the determination of an anomaly by that method.

For illustrative purposes only, the following example uses a determination module based on limit values 304 can be applied to those CPS variables having a critically important meaning to a particular TP in order to identify critically important anomalies (a first subset). The other CPS variables (the second subset) may be analyzed by a different method, for example, by the method 301. In this case, upon detecting an anomaly only by module 304, the operator of the CPS 240 may receive a message indicating the anomaly with a certain probability value (such as 80%). Furthermore, upon detecting an anomaly by the means 301 or by both modules at the same time a message may be sent as to the presence of the anomaly with a larger probability value (such as 90-100%). Another example might be a situation where the primary CPS variables and the auxiliary CPS variables may be divided into subsets of variables of the CPS based on a particular principle (depending on the characteristics of the subsets—whether they belong to a particular type of equipment, the physical meaning—whether they belong to a certain physical process, the same type of physical variables of the CPS, for example temperature or pressure, the level of danger for the TP, and so forth). A method of determination of anomalies may be selected individually for each subset of CPS variables (implemented by one of the means 301-304). After the selection is met, the level of criticality may be evaluated for the anomalies determined from the CPS variables of each subset of CPS variables. As a result of the aforementioned operations, the overall level of criticality may be calculated for each anomaly. In an aspect, the overall level of criticality may be calculated by averaging the levels of criticality for all methods which have determined the particular anomaly. In an aspect, the anomaly determination module 260 may confirm the anomaly if the overall level of criticality is greater than a given predefined threshold (for example, over 0.5). Otherwise, the anomaly determination module does not confirm the anomaly. It should be noted that the level of criticality of the anomalies may be determined from the CPS variables for each subset of CPS variables and may be specified for example by the operator of the CPS 240, using a previously trained machine learning model 230 to assess the level of criticality, with the use of statistical data on previously determined anomalies.

In yet another aspect, the anomaly determination module 260 may include a graphic interface system for the determination of an anomaly manually by the operator of the CPS 240, the information concerning which can be transmitted by a feedback interface 230.

In an aspect, the information on the anomalies in the CPS 200 may further include the following statements about the anomaly: the time interval for observation of the anomaly, the contribution of each variable of the CPS to the anomaly, information on the method of identifying said anomaly, the values of the CPS variables at each moment of the time interval. In yet another aspect, the information about the anomalies in the CPS 200 may additionally include for each CPS variable at least one of: the time series of values, the current magnitude of the deviation of the predicted value from the actual value, the smoothed value of the deviation of the predicted value from the actual value. In another particular instance, the information about the anomalies in the CPS 200 may include information on the means (method) used to identify the anomaly.

Figure 4:
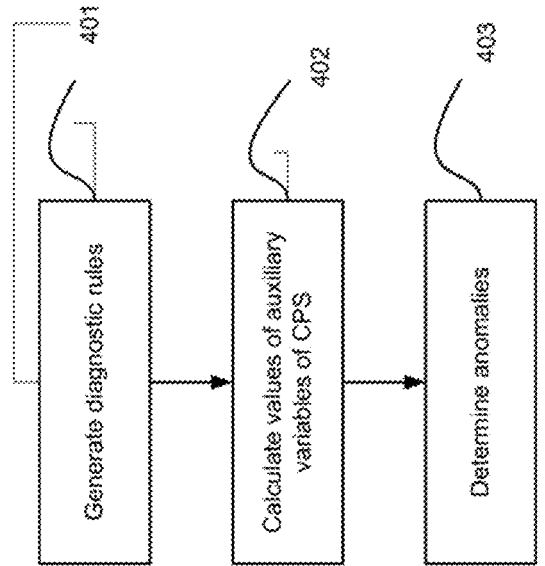
FIG. 4 is a flowchart illustrating an example method for determination of anomalies in a cyber-physical system.

FIG. 4 is a flowchart illustrating an example of the method for determination of an anomaly in a cyber-physical system.

In an aspect, at step 401, the generating module 210 may generate at least one diagnostic rule configured to calculate at least one auxiliary CPS variable by specifying a group of CPS variables to be used in the diagnostic rule. The group of CPS variables may be specified automatically in accordance with the characteristics of the CPS 200. Moreover, the group of CPS variables may be specified by obtaining feedback from the operator of the CPS 240 via the feedback interface 230. The values of the CPS variables from the given group may be sampled on time grids which are not uniform over time and not synchronized. In an aspect, the generating module 210 may receive an input method that may be specified for calculating the values of at least one auxiliary CPS variable of the CPS from the data of the values of the group of CPS variables. The method of using the diagnostic rule may then be specified. In other words, the generating module 210 may receive an input indicating the method for generating and calculating the values of at least one auxiliary CPS variable from the data of the values of the specified group of CPS variables. Next, the generating module 210 may receive as input an input window specified for the application of the rule, being an interval of time $[t-\Delta t, t]$, oriented retrospectively, where $t>0$ is the current moment of time and $\Delta t>0$ is the dimension of the input window. The diagnostic rule may use the values of the group of CPS variables that may be specified in the input window, that is, at moments of time inside the input window. In step 402, the generating module 210 may calculate the values of at least one auxiliary CPS variable for the output window, using the values of the group of CPS variables for the input window in accordance with the generated diagnostic rule. As a result, in step 403, the anomaly determination module 260 may determine an anomaly in the CPS 200 by analyzing the values of all the CPS variables of the CPS, including the at least one auxiliary CPS variable.

The other aspect previously described in conjunction with FIG. 1a to FIG. 3 may also be applicable to the method of FIG. 4.

Thus, the proposed aspects enable a solution to the stated technical problem and achieve the stated technical result, namely, enhancement of the accuracy of the detection of anomalies in a CPS 200 by the calculation of auxiliary CPS variables to be used in determination of the anomaly in the CPS 200.

Figure 5:
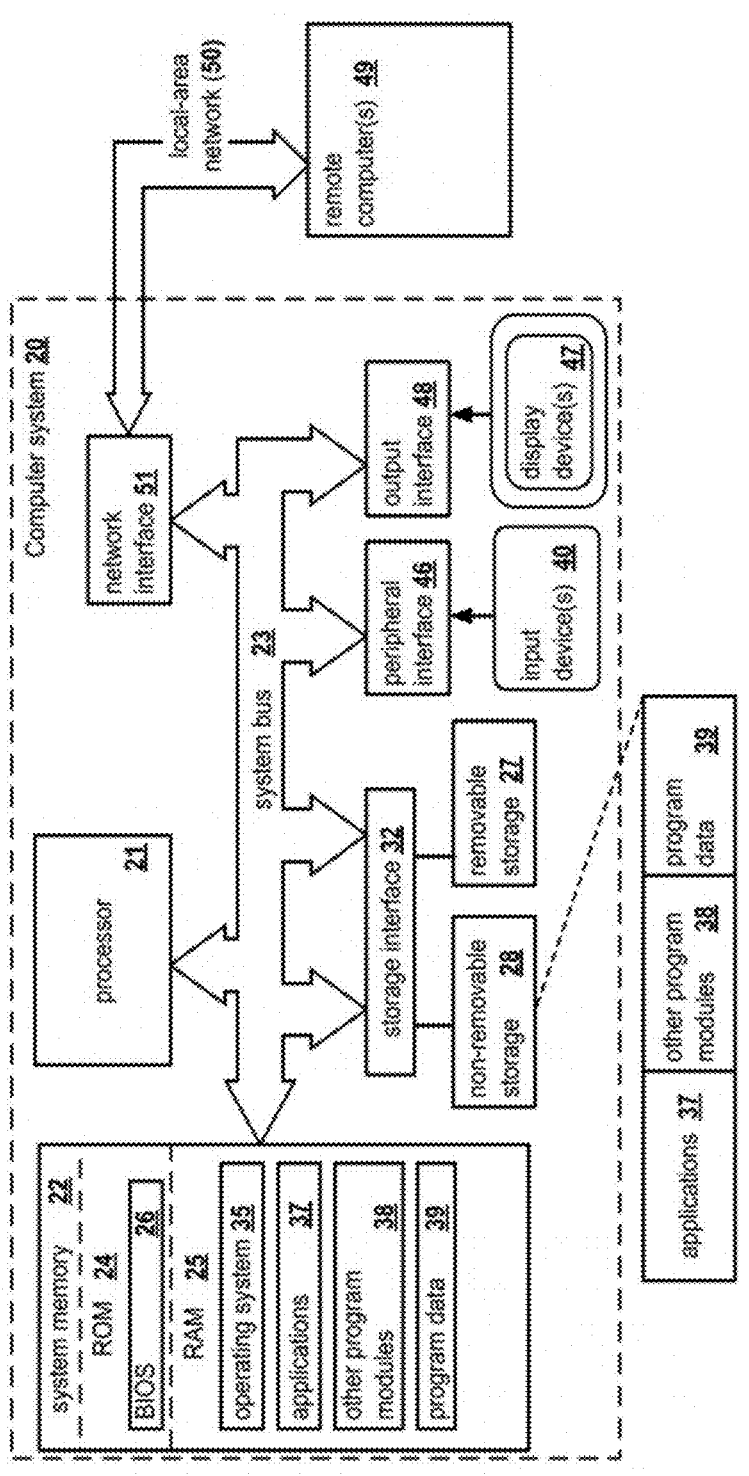
FIG. 5 shows an example of a computer system on which variant aspects of systems and methods disclosed herein may be implemented.

FIG. 5 shows an example of a computer system on which variant aspects of systems and methods disclosed herein may be implemented. The computer system 20 may represent the system for determination of anomalies in a cyber-physical system of FIG. 2 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for determination of anomalies in a cyber-physical system (CPS), the method comprising:
   generating one or more diagnostic rules configured to calculate at least one auxiliary CPS variable representing synthetic data derived from a group of primary CPS variables;
   calculating, via a computer-implemented method of calculating one or more values of the at least one auxiliary CPS variable, the synthetic data comprising the one or more values of the at least one auxiliary CPS variable for a predefined output interval of time based on collected values of the group of primary CPS variables sampled from telemetry data of the CPS for a predefined input interval of time based on the one or more generated diagnostic rules; and
   determining, via a computer-implemented method of determination of anomalies, an anomaly in the CPS based on the collected values of the group of primary CPS variables and the synthetic data.

2. The method of claim 1, wherein generating each of the one or more diagnostic rules comprises specifying at least one of:
   the group of primary CPS variables to be used in the diagnostic rule;
   the computer-implemented method of calculating the one or more values of the at least one auxiliary CPS variable from the collected values of the group of primary CPS variables; or
   at least one input interval of time for the collected values of the group of primary CPS variables and at least one output interval of time for calculating the one or more values of the auxiliary CPS variable.

3. The method of claim 2, wherein the computer-implemented method of calculating the one or more values of the at least one auxiliary CPS variable comprises at least one of:
   a predetermined formula for calculating the one or more values of the at least one auxiliary CPS variable from the collected values of the group of primary CPS variables;
   a method of calculating the one or more values of the at least one auxiliary CPS variable by smoothing the collected values of the group of primary CPS variables;
   a method of calculating the one or more values of the at least one auxiliary CPS variable by calculating at least one of: long-term trends of the collected values of the group of primary CPS variables, perform polynomial approximations of the collected values of the group of primary CPS variables, determine statistical window points of the group of primary CPS variables; or
   a method of calculating the one or more values of at least one auxiliary CPS variable by using a previously trained machine learning model to calculate the one or more values of at least one auxiliary CPS variable, wherein the collected values of the group of primary CPS variables is used as input data for the machine learning model.

4. The method of claim 1, wherein the collected values of a group of primary CPS variables comprise at least one of:
   measurement obtained by a data transmitter;
   a value of a manipulated variable of an actuating mechanism;
   a setpoint of the actuating mechanism;

a value of input signals of a proportional-integral-derivative (PID) controller; or a value of an output signal of the PID controller.

5. The method of claim 1, wherein the one or more diagnostic rules comprise one or more recursive diagnostic rules, and wherein at least one previously calculated auxiliary CPS variable is used as a primary CPS variable in the group of primary CPS variables.

6. The method of claim 1, wherein the group of primary CPS variables comprises a subset of all CPS variables.

7. The method of claim 6, wherein determining the anomaly comprises using at least one subset of all CPS variables as input data with the computer-implemented method of calculating the one or more values of the at least one auxiliary CPS variable, and wherein the anomaly is determined by at least one of the following computer-implemented methods of determination of anomalies:

determining if a total error of prediction is greater than a threshold value, wherein the total error of prediction is calculated based on one or more predictions for values of the at least one subset of all CPS variables;

applying the at least one trained machine learning model to the values of the at least one subset of all CPS variables;

determining if at least one rule for determination of anomalies is fulfilled; or determining if a value of at least one variable from the at least one subset of all CPS variables exceeds a predetermined range of values for the at least one variable.

8. The method of claim 7, wherein a method of determination of anomalies is selected individually for each subset of all CPS variables, wherein a level of criticality is calculated for one or more anomalies determined from each subset of all CPS variables, and wherein an overall level of criticality is calculated for each of the one or more determined anomalies.

9. The method of claim 8, wherein the overall level of criticality is calculated by averaging two or more levels of criticality for all methods used to determine a particular anomaly, and wherein the anomaly is confirmed if the overall level of criticality is greater than a predefined threshold.

10. The method of claim 9, wherein one or more levels of criticality are specified by at least one of: an operator of the CPS, a previously trained machine learning model using statistical data on previously determined anomalies.

11. The method of claim 7, wherein the at least one subset of all CPS variables is selected based on at least one of the following characteristics of the at least one subset: significance of variables of the at least one subset to a Technological Process (TP); the variables of the at least one subset belonging to a predefined type of equipment; or a physical or chemical process.

12. A system for determination of anomalies in a cyber-physical system (CPS), the system comprising:

a memory and a hardware processor configured to:

generate one or more diagnostic rules configured to calculate at least one auxiliary CPS variable representing synthetic data derived from a group of primary CPS variables;

calculate, via a computer-implemented method of calculating one or more values of the at least one auxiliary CPS variable, the synthetic data comprising the one or more values of the at least one auxiliary CPS variable for a predefined output interval of time based on collected values of the group of primary CPS variables sampled from telemetry data of the CPS for a predefined input interval of time based on the one or more generated diagnostic rules; and determine, via a computer-implemented method of determination of anomalies, an anomaly in the CPS based on the collected values of the group of primary CPS variables and the synthetic data.

13. The system of claim 12, wherein the hardware processor configured to generate each of the one or more diagnostic rules is further configured to specify at least one of:

the group of primary CPS variables to be used in the diagnostic rule;

the computer-implemented method of calculating the one or more values of the at least one auxiliary CPS variable from the collected values of the group of primary CPS variables; or at least one input interval of time for the collected values of the group of primary CPS variables and at least one output interval of time for calculating the one or more values of the auxiliary CPS variable.

14. The system of claim 12, wherein the computer-implemented method of calculating the one or more values of the at least one auxiliary CPS variable comprises at least one of:

a predetermined formula for calculating the one or more values of the at least one auxiliary CPS variable from the collected values of the group of primary CPS variables;

a method of calculating the one or more values of the at least one auxiliary CPS variable by smoothing the collected values of the group of primary CPS variables;

a method of calculating the one or more values of the at least one auxiliary CPS variable by calculating at least one of: long-term trends of the collected values of the group of primary CPS variables, perform polynomial approximations of the collected values of the group of primary CPS variables, determine statistical window points of the group of primary CPS variables; or a method of calculating the one or more values of at least one auxiliary CPS variable by using a previously trained machine learning model to calculate the one or more values of at least one auxiliary CPS variable, wherein the collected values of the group of primary CPS variables is used as input data for the machine learning model.

15. The system of claim 12, wherein the collected values of a group of primary CPS variables comprise at least one of:

measurement obtained by a data transmitter;

a value of a manipulated variable of an actuating mechanism;

a setpoint of the actuating mechanism;

a value of input signals of a proportional-integral-derivative (PID) controller; or a value of an output signal of the PID controller.

16. The system of claim 12, wherein the one or more diagnostic rules comprise one or more recursive diagnostic rules, and wherein at least one previously calculated auxiliary CPS variable is used as a primary CPS variable in the group of primary CPS variables.

17. The system of claim 12, wherein the group of primary CPS variables comprises a subset of all CPS variables.

18. The system of claim 17, wherein the hardware processor configured to determine the anomaly is further configured to use at least one subset of all CPS variables as input data with the computer-implemented method of calculating the one or more values of the at least one auxiliary CPS variable, and wherein the anomaly is determined by at least one of the following computer-implemented methods of determination of anomalies:

determining if a total error of prediction is greater than a threshold value, wherein the total error of prediction is calculated based on one or more predictions for values of the at least one subset of all CPS variables;

applying the at least one trained machine learning model to the values of the at least one subset of all CPS variables;

determining if at least one rule for determination of anomalies is fulfilled; or determining if a value of at least one variable from the at least one subset of all CPS variables exceeds a predetermined range of values for the at least one variable.

19. The system of claim 18, wherein a method of determination of anomalies is selected individually for each subset of all CPS variables, wherein a level of criticality is calculated for one or more anomalies determined from each subset of all CPS variables, and wherein an overall level of criticality is calculated for each of the one or more determined anomalies.

20. A non-transitory computer readable medium storing thereon computer executable instructions for determination of anomalies in a cyber-physical system (CPS), including instructions for:

generating one or more diagnostic rules configured to calculate at least one auxiliary CPS variable representing synthetic data derived from a group of primary CPS variables;

calculating, via a computer-implemented method of calculating one or more values of the at least one auxiliary CPS variable, the synthetic data comprising the one or more values of the at least one auxiliary CPS variable for a predefined output interval of time based on collected values of the group of primary CPS variables sampled from telemetry data of the CPS for a predefined input interval of time based on the one or more generated diagnostic rules; and determining, via a computer-implemented method of determination of anomalies, an anomaly in the CPS based on the collected values of the group of primary CPS variables and the synthetic data.

* * * * *